US012670360B2

(12) United States Patent
Yang

(10) Patent No.: US 12,670,360 B2
(45) Date of Patent: Jun. 30, 2026

(54) RECOMMENDATION METHOD AND APPARATUS, AND METHOD AND APPARATUS FOR PUBLISHING ONLINE PREDICTION MODEL

(71) Applicant: BIGO TECHNOLOGY PTE. LTD., Singapore (SG)

(72) Inventor: Wanpeng Yang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 754 days.

(21) Appl. No.: 18/005,941

(22) PCT Filed: Jun. 1, 2021

(86) PCT No.: PCT/CN2021/097664
§ 371 (c)(1),
(2) Date: Jan. 18, 2023

(87) PCT Pub. No.: WO2022/017001
PCT Pub. Date: Jan. 27, 2022

(65) Prior Publication Data
US 2023/0351147 A1 Nov. 2, 2023

(30) Foreign Application Priority Data
Jul. 21, 2020 (CN) .......................... 202010707254.2

(51) Int. Cl.
*G06N 3/09* (2023.01)
*G06F 16/2455* (2019.01)
*G06N 3/04* (2023.01)

(52) U.S. Cl.
CPC ........... *G06N 3/04* (2013.01); *G06F 16/2455* (2019.01)

(58) Field of Classification Search
CPC .............................. G06N 3/09; G06Q 30/0631
See application file for complete search history.

(56) References Cited

U.S. PATENT DOCUMENTS

2017/0083965 A1 3/2017 Sun
2019/0236680 A1* 8/2019 Kounine ................. G06F 17/16
2020/0364743 A1* 11/2020 Lerner ................... G06N 20/00

FOREIGN PATENT DOCUMENTS

CN 110704728 A 1/2020
CN 110717099 A 1/2020
(Continued)

OTHER PUBLICATIONS

International Search Report of the International Searching Authority for State Intellectual Property Office of the People's Republic of China in PCT application No. PCT/CN2021/097664 issued on Aug. 27, 2021, which is an international application to which this application claims priority.

*Primary Examiner* — Grace Park
(74) *Attorney, Agent, or Firm* — Kolitch Romano Dascenzo Gates LLP

(57) ABSTRACT

Provided is a recommendation method. The method includes: determining a target user identifier and a plurality of candidate item identifiers; acquiring the intermediate user feature vector corresponding to the target user identifier by searching for the target user identifier; acquiring the intermediate item feature vectors corresponding to the plurality of candidate item identifiers by searching for the plurality of candidate item identifiers; outputting degrees of matching of the plurality of candidate item identifiers and the target user identifier by predicting the intermediate user feature vector and the intermediate item feature vectors in the online prediction model; and determining a target item identifier to be recommended to the target user identifier from the plurality of candidate item identifiers.

17 Claims, 9 Drawing Sheets

(56) References Cited

FOREIGN PATENT DOCUMENTS

| CN | 111310053 | A | 6/2020 |
| CN | 111859133 | A | 10/2020 |

* cited by examiner

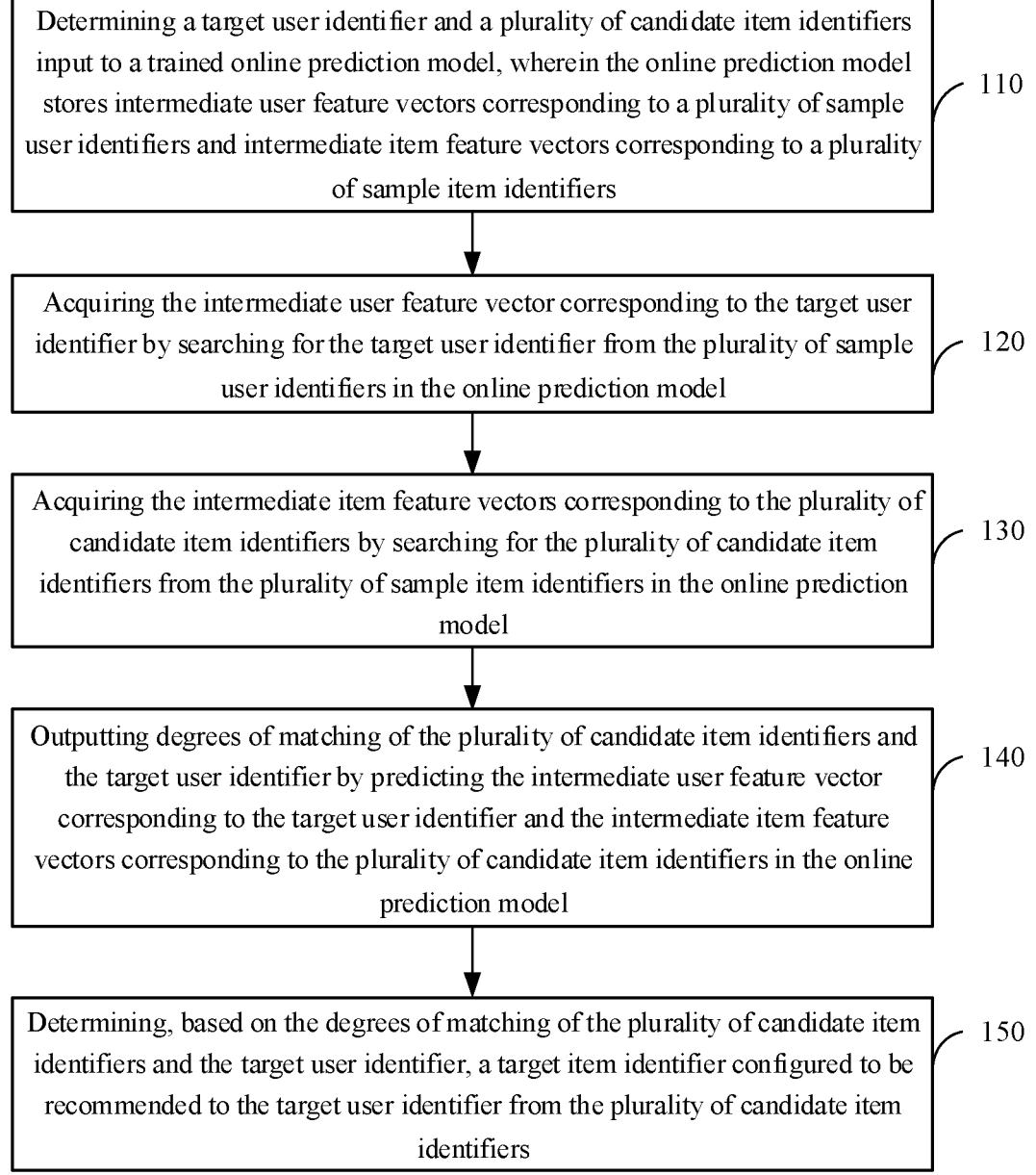

Determining a target user identifier and a plurality of candidate item identifiers input to a trained online prediction model, wherein the online prediction model stores intermediate user feature vectors corresponding to a plurality of sample user identifiers and intermediate item feature vectors corresponding to a plurality of sample item identifiers — 110

Acquiring the intermediate user feature vector corresponding to the target user identifier by searching for the target user identifier from the plurality of sample user identifiers in the online prediction model — 120

Acquiring the intermediate item feature vectors corresponding to the plurality of candidate item identifiers by searching for the plurality of candidate item identifiers from the plurality of sample item identifiers in the online prediction model — 130

Outputting degrees of matching of the plurality of candidate item identifiers and the target user identifier by predicting the intermediate user feature vector corresponding to the target user identifier and the intermediate item feature vectors corresponding to the plurality of candidate item identifiers in the online prediction model — 140

Determining, based on the degrees of matching of the plurality of candidate item identifiers and the target user identifier, a target item identifier configured to be recommended to the target user identifier from the plurality of candidate item identifiers — 150

FIG. 1

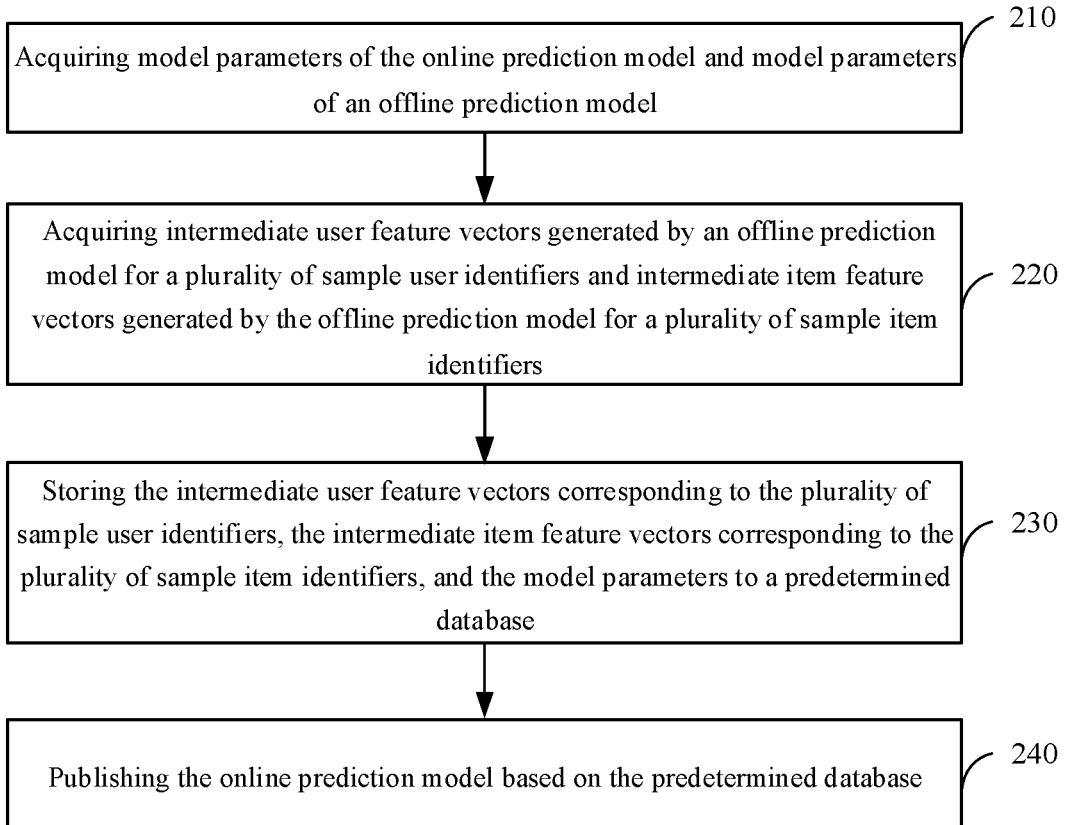

Acquiring model parameters of the online prediction model and model parameters of an offline prediction model — 210

Acquiring intermediate user feature vectors generated by an offline prediction model for a plurality of sample user identifiers and intermediate item feature vectors generated by the offline prediction model for a plurality of sample item identifiers — 220

Storing the intermediate user feature vectors corresponding to the plurality of sample user identifiers, the intermediate item feature vectors corresponding to the plurality of sample item identifiers, and the model parameters to a predetermined database — 230

Publishing the online prediction model based on the predetermined database — 240

FIG. 2

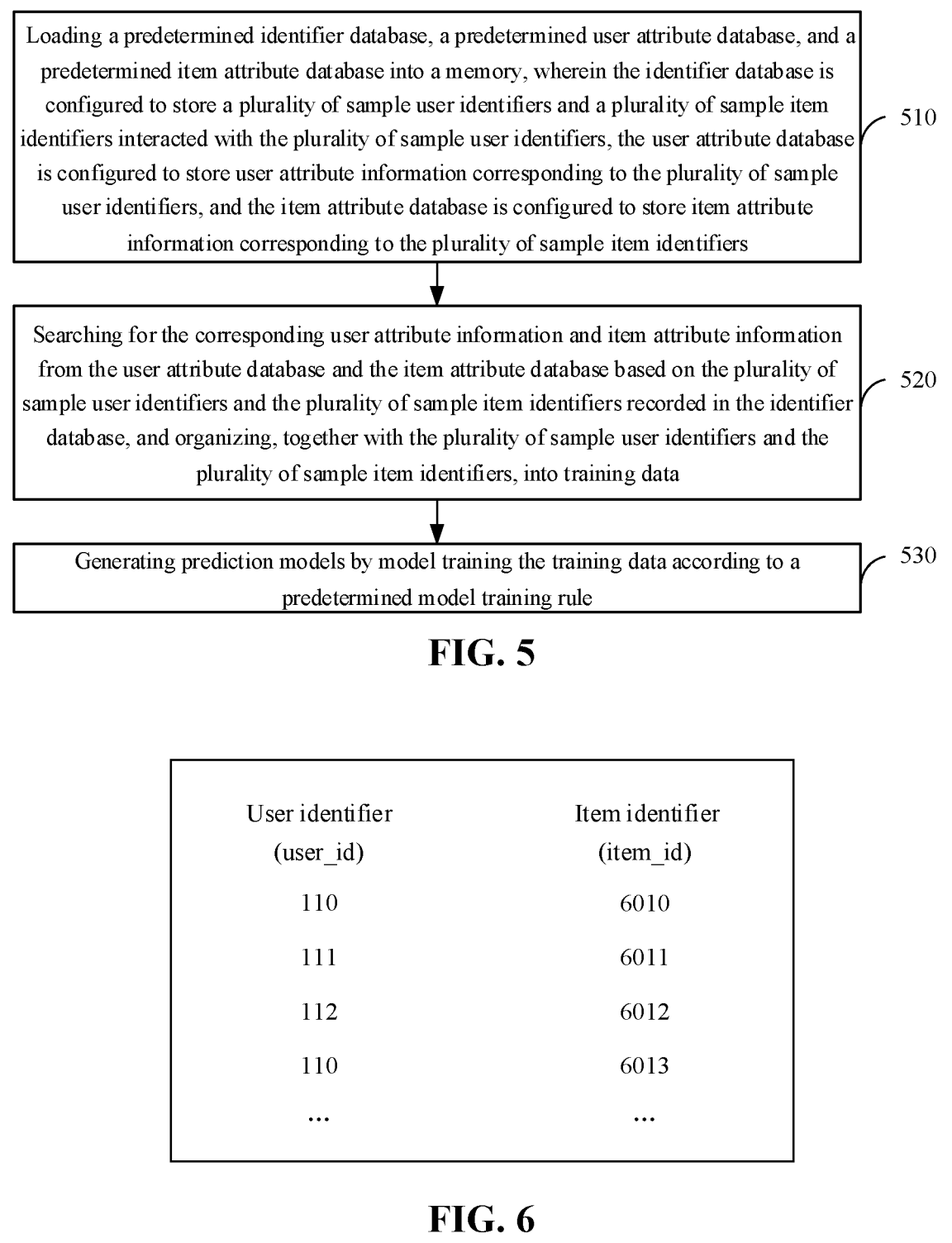

Loading a predetermined identifier database, a predetermined user attribute database, and a predetermined item attribute database into a memory, wherein the identifier database is configured to store a plurality of sample user identifiers and a plurality of sample item identifiers interacted with the plurality of sample user identifiers, the user attribute database is configured to store user attribute information corresponding to the plurality of sample user identifiers, and the item attribute database is configured to store item attribute information corresponding to the plurality of sample item identifiers — 510

Searching for the corresponding user attribute information and item attribute information from the user attribute database and the item attribute database based on the plurality of sample user identifiers and the plurality of sample item identifiers recorded in the identifier database, and organizing, together with the plurality of sample user identifiers and the plurality of sample item identifiers, into training data — 520

Generating prediction models by model training the training data according to a predetermined model training rule — 530

FIG. 5

| User identifier (user_id) | Item identifier (item_id) |
|---|---|
| 110 | 6010 |
| 111 | 6011 |
| 112 | 6012 |
| 110 | 6013 |
| ... | ... |

FIG. 6

| User identifier (user_id) | Age | Gender | |
|---|---|---|---|
| 110 | 16 | Male | |
| 111 | 23 | Female | ... |
| 112 | 18 | Female | |
| ... | ... | ... | |

FIG. 7

| Item identifier (item_id) | Tag | Country |
|---|---|---|
| 6010 | Exercise, outdoor | IN |
| 6011 | Beauty, funny | ID |
| 6012 | Tourism, scenery | RU |
| ... | ... | ... |

FIG. 8

| User identifier (user_id) | Item identifier (item_id) | Age | Gender | Tag | Country |
|---|---|---|---|---|---|
| 110 | 6010 | 16 | Male | Exercise, outdoor | IN |
| 111 | 6011 | 23 | Female | Beauty, funny | ID |
| 112 | 6012 | 18 | Female | Tourism, scenery | RU |
| 110 | 6013 | 28 | Male | Story, funny | ID |
| ... | ... | ... | ... | ... | ... |

FIG. 9

| Input information determining module | 1110 |
| Intermediate user feature vector searching module | 1120 |
| Intermediate item feature vector searching module | 1130 |
| Predicting module | 1140 |
| Target item identifier determining module | 1150 |

| Model parameter acquiring module | 1210 |
| Intermediate vector acquiring module | 1220 |
| Storing module | 1230 |
| Model publishing module | 1240 |

RECOMMENDATION METHOD AND APPARATUS, AND METHOD AND APPARATUS FOR PUBLISHING ONLINE PREDICTION MODEL

CROSS-REFERENCE TO RELATED APPLICATION

This application is a U.S. national stage of international application No. PCT/CN2021/097664, filed on Jun. 1, 2021, which is based on and claims priority to Chinese Patent Application No. 202010707254.2 filed on Jul. 21, 2020, and the disclosures of which are herein incorporated by references in their entireties.

TECHNICAL FIELD

The present disclosure relates to the field of display technologies, and in particular, relates to a recommendation method and apparatus, and a method and apparatus for publishing an online prediction model.

BACKGROUND

With rapid developments of the Internet, due to explosive growth of information, it is becoming more and more difficult for users to acquire valid content of interest. In order to help the users quickly acquire the valid content of interest, customized recommendation systems are developed and play an increasingly important role in news, short videos, music, and other products.

SUMMARY

A summary of the present disclosure is described hereinafter. The summary is not intended to limit the scope of protection of claims.

The present disclosure provides a recommendation method and apparatus, and a method and apparatus for publishing an online prediction model, so as to avoid cases of storage space consumption, access time consumption, a large amount of calculation, and the like that are caused by a large amount of original feature data in an online prediction model in some practices.

According to some embodiments of the present disclosure, a recommendation method is provided. The method includes:

determining a target user identifier and a plurality of candidate item identifiers input to a trained online prediction model, wherein the online prediction model stores intermediate user feature vectors corresponding to a plurality of sample user identifiers and intermediate item feature vectors corresponding to a plurality of sample item identifiers;

acquiring the intermediate user feature vector corresponding to the target user identifier by searching for the target user identifier from the plurality of sample user identifiers in the online prediction model;

acquiring the intermediate item feature vectors corresponding to the plurality of candidate item identifiers by searching for the plurality of candidate item identifiers from the plurality of sample item identifiers in the online prediction model;

outputting degrees of matching of the plurality of candidate item identifiers and the target user identifier by predicting the intermediate user feature vector corresponding to the target user identifier and the intermediate item feature vectors corresponding to the plurality of candidate item identifiers in the online prediction model; and determining, based on the degrees of matching of the plurality of candidate item identifiers and the target user identifier, a target item identifier configured to be recommended to the target user identifier from the plurality of candidate item identifiers.

According to some embodiments of the present disclosure, a method for publishing an online prediction model is provided. The method includes:

acquiring model parameters of the online prediction model and model parameters of an offline prediction model;

acquiring intermediate user feature vectors generated by an offline prediction model for a plurality of sample user identifiers and intermediate item feature vectors generated by the offline prediction model for a plurality of sample item identifiers;

storing the intermediate user feature vectors corresponding to the plurality of sample user identifiers, the intermediate item feature vectors corresponding to the plurality of sample item identifiers, and the model parameters to a predetermined database; and publishing the online prediction model based on the predetermined database.

According to some embodiments of the present disclosure, a computer device is provided. The computer device includes a memory, a processor, and one or more computer programs stored on the memory and runnable on the processor, wherein the processor, when loading and running the one or more computer programs, is caused to perform the above method.

According to some embodiments of the present disclosure, a non-volatile computer-readable storage medium is provided. The non-volatile computer-readable storage medium stores one or more computer programs, wherein the one or more computer programs, when loaded and run by a processor, cause the processor to perform the above method.

BRIEF DESCRIPTION OF THE DRAWINGS

FIG. 1 is a flowchart of a recommendation method according to some embodiments of the present disclosure;

FIG. 2 is a flowchart of a method for publishing an online prediction model according to some embodiments of the present disclosure;

FIG. 5 is a flowchart of a method for training a prediction model according to some embodiments of the present disclosure;

FIG. 6 is a schematic diagram of an identifier database according to some embodiments of the present disclosure;

FIG. 7 is a schematic diagram of a user attribute database according to some embodiments of the present disclosure;

FIG. 8 is a schematic diagram of an item attribute database according to some embodiments of the present disclosure;

FIG. 9 is a schematic diagram of a training data set according to some embodiments of the present disclosure;

DETAILED DESCRIPTION

Figure 3:
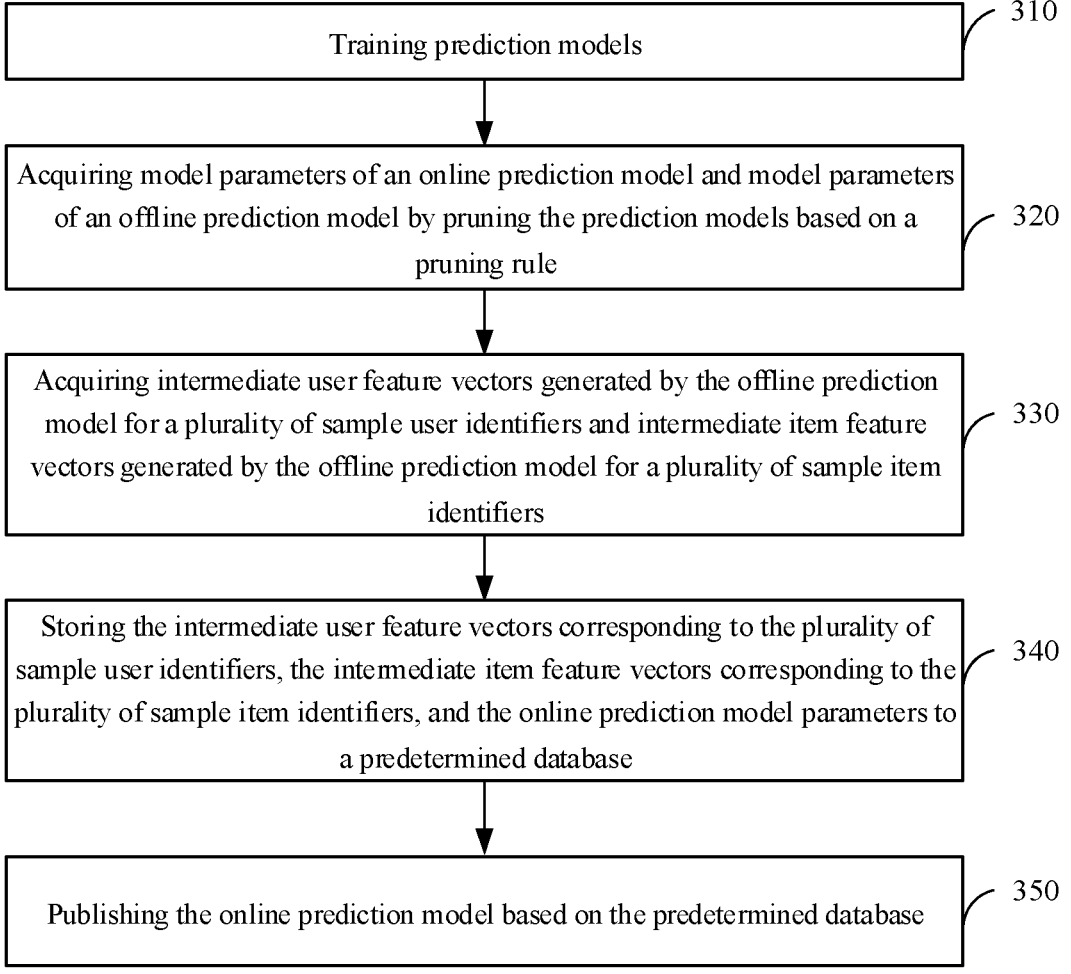
FIG. 3 is a flowchart of another method for publishing an online prediction model according to some embodiments of the present disclosure.

The present disclosure is further described in detail hereinafter with reference to the accompanying drawings and the embodiments. It should be noted that the exemplary embodiments described herein are merely used to explain the present disclosure, and are not intended to limit the present disclosure. It should be further noted that some, but not all of the structures related to the present disclosure are illustrated in the accompanying drawings for convenient description.

In some practices, the customized recommendation system generally stores original information of the users and things using a high-performance distributed storage system (for example, a remote dictionary server, Redis). During recommendation, the customized recommendation system acquires original features from the Redis as required, preprocesses the original features and inputs the same to a data model for prediction and scoring, and makes recommendation based on scoring results.

However, the following issues are present in the recommendation system.

(1) In a recommendation scenario with a large number of users and things, the original features of the users and things occupy a large amount of high-performance distributed storage space, and thus the cost is high.

(2) With the increase of the original features, in a scenario with high queries-per-second, the time elapsed for the recommendation system to access the Redis increases, and several network input/output (I/O) devices give a huge pressure on bandwidth.

(3) Prediction and scoring are time-consuming due to complex calculation of the data model.

FIG. 1 is a flowchart of a recommendation method according to some embodiments of the present disclosure. The embodiments are applicable to scenarios of recommending in real time in news, short video, music, and other products, especially for products with large number of users, multiple delivery times, and strict timeliness. The method is performed by a recommendation system in news, short video, music, and other products with recommendation requirements, and includes the following processes.

In S110, a target user identifier and a plurality of candidate item identifiers input to a trained online prediction model are determined, wherein the online prediction model stores intermediate user feature vectors corresponding to a plurality of sample user identifiers and intermediate item feature vectors corresponding to a plurality of sample item identifiers.

In the process, the online prediction model is a model that has been published to the online service and is callable by the online service, and the recommendation system achieves a desired recommendation by calling the online prediction model.

In addition, model parameters, the online prediction model in the embodiments further caches some pre-generated intermediate tensor data. In some embodiments, the tensor data at least includes the intermediate user feature vectors (user_emb) corresponding to the plurality of sample user identifiers (user_id) and the intermediate item feature vectors (item_emb) corresponding to a plurality of sample item identifiers (item_id).

In some embodiments, history interaction data is extracted from a log record of a product of the recommendation system, and the history interaction data includes the user identifiers and the item identifiers that are interacted with each other. The user identifier is taken as a sample user identifier, and the item identifier interacted with the user identifier is taken as a sample item identifier.

It should be noted that the items are different depending on products. For example, in a short video application, the item includes short videos; in a music application, the item includes audio video data such as music, videos, and other audio video data; in a news application, the item includes news, pictures, and the like; and in an electronic commerce application, the item includes goods, advertisements, and the like.

In the embodiments, input of the online prediction model includes the target user identifier and the plurality of candidate item identifiers.

In S120, the intermediate user feature vector corresponding to the target user identifier is acquired by searching for the target user identifier from the plurality of sample user identifiers in the online prediction model.

In some embodiments, the plurality of sample user identifiers and the corresponding intermediate user feature vectors are stored in association in the online prediction model. For example, the sample user identifier and the corresponding intermediate user feature vector are stored in the format of a key-value pair, the sample user identifier is taken as a key, and the intermediate user feature vector is taken as a corresponding value. In the case that a number of the intermediate user feature vectors is great, the sample user identifier and the corresponding intermediate user feature vector are stored in the format of an array, and acquired stored data is "user_id {user_emb 1, user_emb 2, user_emb 3, . . . }."

In S120, upon receiving the input target user identifier, the online prediction model searches for the target user identifier from the plurality of cached sample user identifiers, for example, searching for the target user identifier from a cached key list. In the case that a key is successfully searched out, a value corresponding to the successfully searched-out key is acquired and taken as the intermediate user feature vector corresponding to the target user identifier.

In some embodiments, in the case that the target user identifier is not searched from the plurality of sample user identifiers cached in the online prediction model. For example, in the case that the target user identifier is a newly registered user and an interaction (for example, a video interaction, and the like) is not yet carried out in a current product, the intermediate user feature vector corresponding to the target user identifier is determined as a first predetermined vector. The first predetermined vector is set as required. For example, the corresponding intermediate user feature vector is set as a 0 vector, which is not limited in the embodiments of the present disclosure.

In S130, the intermediate item feature vectors corresponding to the plurality of candidate item identifiers are acquired by searching for the plurality of candidate item identifiers from the plurality of sample item identifiers in the online prediction model.

In some embodiments, the plurality of sample item identifiers and the corresponding intermediate item feature vectors are stored in association in the online prediction model. For example, the sample item identifier and the corresponding intermediate item feature vector are stored in the format of a key-value pair, the sample item identifier is taken as a key, and the intermediate item feature vector is taken as a corresponding value. In the case that a number of the intermediate item feature vectors is great, the sample item identifier and the corresponding intermediate item feature vector are stored in the format of an array, and acquired stored data is "item_id {item_emb 1, item_emb 2, item_emb 3, . . . }."

In S130, upon receiving the plurality of candidate item identifiers, the online prediction model searches for the plurality of candidate item identifiers from the plurality of cached sample item identifiers, for example, searching for the candidate item identifier from a cached key list. In the case that a key is successfully searched out, a value corresponding to the successfully searched-out key is acquired and taken as the intermediate item feature vector corresponding to the candidate item identifier.

In some embodiments, in the case that a candidate item identifier is not searched out from the plurality of sample item identifiers cached in the online prediction model. For example, in the case that a short video is a newly uploaded short video and an interaction (for example, a video interaction, and the like) does not occur in a current product, the intermediate item feature vector corresponding to the candidate item identifier is determined as a second predetermined vector. The second predetermined vector is set as required. For example, the corresponding intermediate item feature vector is set as a 0 vector, which is not limited in the embodiments of the present disclosure.

In S140, degrees of matching of the plurality of candidate item identifiers and the target user identifier are output by predicting the intermediate user feature vector corresponding to the target user identifier and the intermediate item feature vectors corresponding to the plurality of candidate item identifiers in the online prediction model.

In the process, upon acquiring the intermediate user feature vector corresponding to the target user identifier and the intermediate item feature vectors corresponding to the plurality of candidate item identifiers, the online prediction model calculates degrees of matching of the intermediate user feature vector and the intermediate item feature vectors based on predetermined prediction processing logic. For example, the degree of matching is a matching score, and the online prediction model scores, based on the intermediate item feature vectors corresponding to the plurality of candidate item identifiers, an estimated click-through rate (CTR, which indicates a click-through rate of issued items, that is, a ratio of an actual number of clicks to a number of display times) of each candidate item for the intermediate user feature vector corresponding to the target user identifier. The greater the score, the more the candidate item identifier matches the target user identifier. The less the score, the less the candidate item identifier matches the target user identifier.

It should be noted that the above prediction processing logic may be achieved by conventional technical means based on the online prediction model, which is not limited in the embodiments of the present disclosure.

In S150, a target item identifier configured to be recommended to the target user identifier is determined from the plurality of candidate item identifiers based on the degrees of matching of the plurality of candidate item identifiers and the target user identifier.

In some embodiments, the candidate item identifiers are ranked based on the degrees of matching, and several candidate item identifiers with top rank and greater scores are taken as the target item identifiers. A number of the target item identifiers is not limited in the embodiments of the present disclosure, which is set by the user or developer as required.

In the case that the target item identifier is determined, a target item corresponding to the target item identifier is recommended to the target user identifier.

In the embodiments of the present disclosure, in recommending the item, the online prediction model directly searches for the corresponding intermediate user feature vector and the intermediate item feature vectors from the cache of the model based on the input target user identifier and the plurality of candidate item identifiers, and thus the processes of acquiring original features corresponding to the target user identifier and the plurality of candidate item identifiers and pre-processing the original features are omitted. Therefore, an amount of calculation of the online prediction model is efficiently reduced, the machine cost is reduced, the estimated time and response delay of the model are reduced, and the prediction performance of the model in the recommendation system is improved.

In addition, as the online prediction model pre-stores the intermediate user feature vector corresponding to the plurality of sample user identifiers and the intermediate item feature vectors corresponding to the plurality of sample item identifiers, the online prediction model directly searches for the corresponding intermediate user feature vector or intermediate item feature vector in different recommendation scenarios of a same user or item in the process of recommending, without repeatedly calculating the intermediate vectors, and thus the amount of calculation of the online prediction model is further reduced.

FIG. 2 is a flowchart of a method for publishing an online prediction model according to some embodiments of the present disclosure. The embodiments are applicable to scenarios of online publishing the online prediction model, and the method is performed by a publishing apparatus and includes the following processes.

In S210, model parameters of the online prediction model and model parameters of an offline prediction model are acquired.

The model parameters are key of a machine learning algorithm and are variables in the model. In practices, the model parameters are acquired by training model codes using training data. Values of the model parameters are estimated based on the data, and the values of the model parameters define usable model.

In some embodiments, the model parameters of the online prediction model include, but not limited to, a weight of a fully connected layer, network parameters and model vector parameters, such as an average and a variance, and the like of a batch normalization (BN) layer.

In S220, intermediate user feature vectors generated by an offline prediction model for a plurality of sample user identifiers and intermediate item feature vectors generated by the offline prediction model for a plurality of sample item identifiers are acquired.

In the embodiments, the offline prediction model is trained, and the offline prediction model is configured to generate the corresponding intermediate user feature vectors for the plurality of sample user identifiers and generate the corresponding intermediate item feature vectors for the plurality of sample item identifiers.

In some embodiments, the offline prediction model includes a user offline prediction model and an item offline prediction model, and S220 includes the following processes.

In S220-1, the plurality of sample user identifiers and the user attribute information corresponding to the plurality of sample user identifiers are input to the user offline prediction model, and the intermediate user feature vectors corresponding to the plurality of sample user identifiers output by the user offline prediction model are acquired.

In the process, the user offline prediction model is a deep neural network model. The input of the user offline prediction model includes the sample user identifier and the user attribute information corresponding to the sample user identifiers, such as age, gender, user statistical features, user history behaviors, and the like, and the output of the model includes the intermediate user feature vector corresponding to the sample user identifier.

In some embodiments, the user attribute information corresponding to the sample user identifier is acquired from a user database corresponding to the product of the current recommendation system, and the user database is illustratively configured to store all registered user identifiers and other attribute information corresponding to the user identifiers.

In S220-2, the plurality of sample item identifiers and the corresponding item attribute information are input to the item offline prediction model, and the intermediate item feature vectors corresponding to the plurality of sample item identifiers output by the item offline prediction model are acquired.

In the process, the item offline prediction model is a deep neural network model. The input of the item offline prediction model includes the sample item identifier and the corresponding item attribute information. For example, in a short video recommendation scenario, the sample item identifier is a short video identifier (ID), the corresponding item attribute information includes a video tag, a photographer identifier, video statistical information, country information, and the like. The output of the model includes the intermediate item feature vector corresponding to the sample item identifier.

In some embodiments, the item attribute information corresponding to the sample item identifier is acquired from an item database corresponding to the product of the current recommendation system, and the item database is configured to store the item identifiers of all online items and the item attribute information corresponding to the item identifiers.

In S230, the intermediate user feature vectors corresponding to the plurality of sample user identifiers, the intermediate item feature vectors corresponding to the plurality of sample item identifiers, and the model parameters are stored to a predetermined database.

In the process, upon the intermediate user feature vectors corresponding to the plurality of sample user identifiers and the intermediate item feature vectors corresponding to the plurality of sample item identifiers being acquired, the intermediate user feature vectors corresponding to the plurality of sample user identifiers, the intermediate item feature vectors corresponding to the plurality of sample item identifiers, and the model parameters of the online prediction model are stored to the predetermined database of the model. In this case, the intermediate user feature vectors corresponding to the plurality of sample user identifiers and the intermediate item feature vectors corresponding to the plurality of sample item identifiers are taken as a part of the model parameters to be stored to the model.

In S240, the online prediction model is published based on the predetermined database.

In the process, the intermediate tensor data (including the above intermediate user feature vectors and intermediate item feature vectors) cached in the predetermined database, together with the model parameters, is published on an online server for the online service to call.

In the embodiments of the present disclosure, in publishing the online prediction model, the intermediate user feature vectors and intermediate item feature vectors, together with the model parameters, are published, such that the intermediate user feature vectors and intermediate item feature vectors are not required to be calculated repeatedly by the online prediction model in predicting. Thus, the amount of calculation of the online prediction model is reduced, and the estimation efficiency of the online prediction model is improved.

FIG. 3 is a flowchart of another method for publishing an online prediction model according to some embodiments of the present disclosure. The process of acquiring model parameters of the online prediction model and model parameters of an offline prediction model is illustrated in the embodiments based on above embodiments, and includes the following processes.

In S310, the prediction models are trained.

In some embodiments, the training data of the prediction models includes the plurality of sample user identifiers and the user attribute information corresponding to the plurality of sample user identifiers, and the plurality of sample item identifiers and the corresponding item attribute information. For example, each piece of the training data of the prediction models at least includes the sample user identifier, the sample item identifier, the user attribute information, the item attribute information, and the like.

In some embodiments, the prediction model is generated by training the training data in a batchwise fashion. In addition, the sample user identifier and the sample item identifier occurred in the sample are recorded in training the model for sequent use.

In S320, the model parameters of the online prediction model and the model parameters of the offline prediction model are acquired by pruning the prediction models based on a pruning rule.

Figure 4:
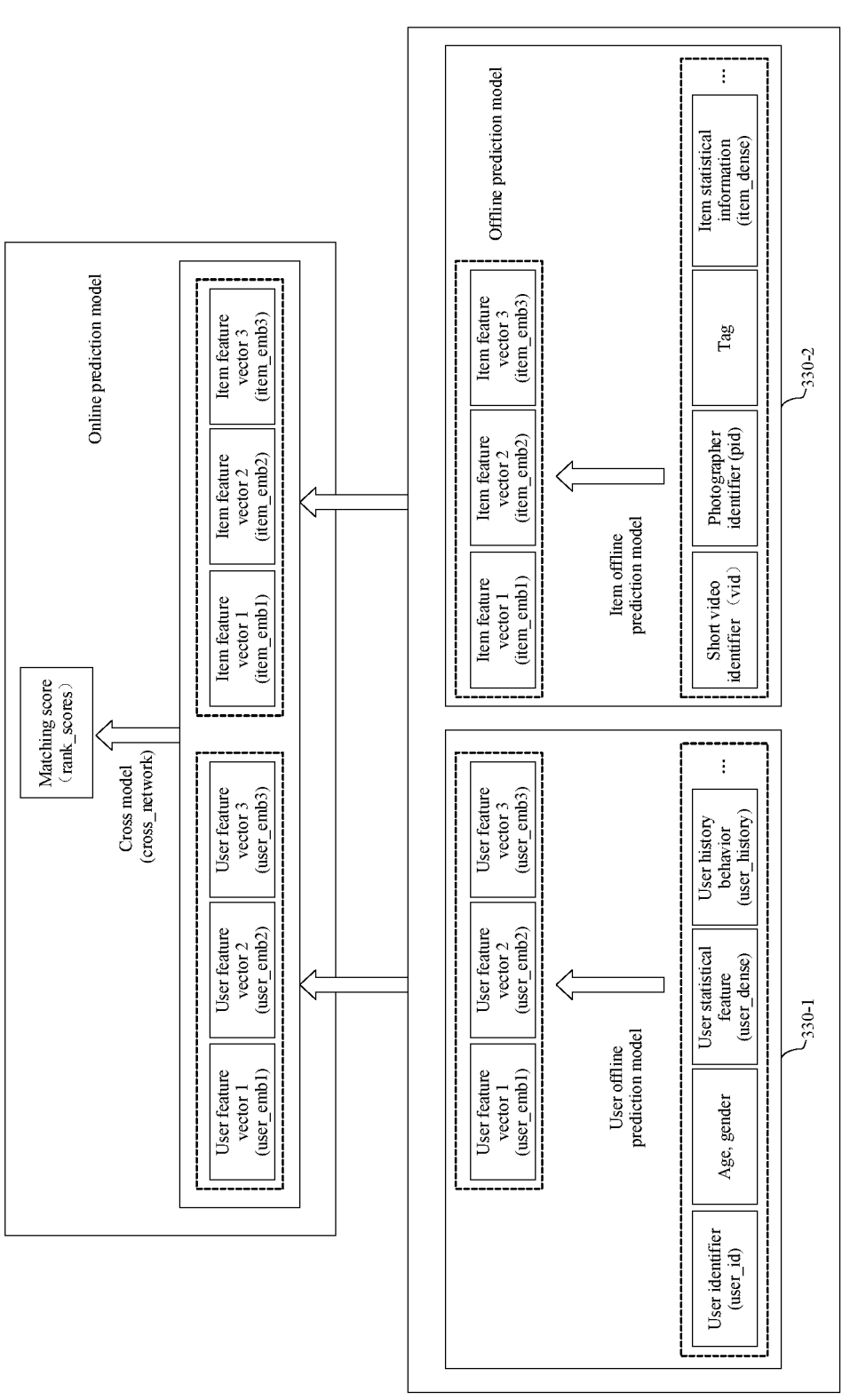
FIG. 4 is a schematic diagram of a prediction model according to some embodiments of the present disclosure.

In some embodiments, as shown in FIG. 4, the trained prediction models include two portions, the online prediction model (online_predict_network) and the offline prediction model (offline_predict_network). The offline prediction model is configured to generate the intermediate tensor data of the plurality of samples offline, and the online prediction model is configured to online predict in real time and output matching scores (rank_scores).

Upon generation of the prediction model, the online prediction model and the offline prediction model are acquired by pruning the prediction model based on the pruning rule. The pruning rule may be set by the developer according to the requirement. For example, in the embodiments, based on the functions, necessary portion of the online prediction/inference belongs to the portion of an online network, and remaining portion belongs to the offline prediction model.

In S330, the intermediate user feature vectors generated for the plurality of sample user identifiers and the intermediate item feature vectors generated for the plurality of sample item identifiers by the offline prediction model corresponding to the model parameters of the offline prediction model are acquired.

In some embodiments, as shown in FIG. 4, the offline prediction model includes a user offline prediction model (user_side_network) and an item offline prediction model (item_side_network), and the S330 includes the following processes.

In S330-1, the plurality of sample user identifiers and the user attribute information corresponding to the plurality of sample user identifiers are input to the user offline prediction model, and the intermediate user feature vectors corresponding to the plurality of sample user identifiers output by the user offline prediction model are acquired.

In the process, the user offline prediction model is a deep neural network model. As shown in FIG. 4, the input of the user offline prediction model includes the sample user identifier (user_id) and the user attribute information corresponding to the sample user identifiers, such as age, gender, user statistical features (user_dense), user history behaviors (user_history), and the like, and the output of the model includes the intermediate user feature vector corresponding to the sample user identifier, such as user_emb1, user_emb2, user_emb3, and other tensor data.

In some embodiments, the user attribute information corresponding to the sample user identifier is acquired from a user database corresponding to the product of the current recommendation system.

In S330-2, the plurality of sample item identifiers and the corresponding item attribute information are input to the item offline prediction model, and the intermediate item feature vectors corresponding to the plurality of sample item identifiers output by the item offline prediction model are acquired.

The item offline prediction model is a deep neural network model. The input of the item offline prediction model includes the sample item identifier and the corresponding item attribute information. For example, in a short video recommendation scenario, as shown in FIG. 4, the sample item identifier is a short video identifier (that is, "vid" in FIG. 4), the corresponding item attribute information includes a video tag, a photographer identifier (that is, "pid" in FIG. 4), video statistical information (item_dense), country information (country), and the like. The output of the model includes the intermediate item feature vector corresponding to the sample item identifier, such as, item_emb1, item_emb2, item_emb3, and other tensor data.

In S340, the intermediate user feature vectors corresponding to the plurality of sample user identifiers, the intermediate item feature vectors corresponding to the plurality of sample item identifiers, and the model parameters of the online prediction model are stored to a predetermined database.

In the process, a database needed to be established to cache the tense data acquired from the offline prediction model. As shown in FIG. 4, user_emb1, user_emb2, user_emb3, item_emb1, item_emb2, item_emb3, and other tensor data output by the offline prediction model, together with the model parameters, are stored on the predetermined database of the online prediction model.

In S350, the online prediction model is published based on the predetermined database.

In the embodiments of the present disclosure, the prediction models are divided into two portions, the online prediction model and the offline prediction model, and the online prediction model is pruned from the prediction model and published on the online server. Comparing with publishing the whole prediction model, a complexity of the network structure of the online prediction model is reduced, and the machine cost is reduced, which make it possible to provide online of a more complex and huger model.

FIG. 5 is a flowchart of a method for training a prediction model according to some embodiments of the present disclosure. The process of training the prediction model is illustrated in the embodiments based on the above embodiments, and includes the following processes.

In S510, a predetermined identifier database, a predetermined user attribute database, and a predetermined item attribute database are loaded into a memory, wherein the identifier database is configured to store the plurality of sample user identifiers and the plurality of sample item identifiers interacted with the plurality of sample user identifiers, the user attribute database is configured to store user attribute information corresponding to the plurality of sample user identifiers, and the item attribute database is configured to store item attribute information corresponding to the plurality of sample item identifiers.

In the embodiments, the sample data is organized into three parts for storage, and databases for storing include an identifier database, a user attribute database, and an item attribute database.

The identifier database is configured to store the plurality of sample user identifiers and the plurality of sample item identifiers interacted with the plurality of sample user identifiers. For example, as shown in FIG. 6, the identifier database stores the plurality of sample user identifiers user_id and the plurality of sample item identifiers item_id interacted with the plurality of sample user identifiers user_id. In some embodiments, the history interaction data is extracted from the log record of the product of the recommendation system, and the history interaction data includes the user identifiers and the item identifiers that are interacted with each other. The user identifier is taken as the sample user identifier, and the item identifier interacted with the user identifier is taken as the sample item identifier. Then, each sample user identifier and the sample item identifier interacted with the sample user identifier are stored in association in the identifier database.

The user attribute database is configured to store the user attribute information corresponding to the plurality of sample user identifiers. For example, as shown in FIG. 7, the user attribute database stores the user attribute information corresponding to the user_id, such as age, gender, and the like. In some embodiments, the sample user identifiers in the identifier database, such as the two identifiers of user_id being 110 in FIG. 6, are combined, and a data record of one identifier of user_id being 110 is recorded in the user attribute database in combining, as shown in a first record shown in FIG. 7. The user attribute information corresponding to the plurality of sample user identifiers are searched out from the user database of the current product to be stored in the user attribute database.

The item attribute database is configured to store the item attribute information corresponding to the plurality of sample item identifiers. For example, as shown in FIG. 8, the item attribute database stores the item attribute information corresponding to the item_id, such as tag, country, and the like. In some embodiments, the same sample item identifiers in the identifier database are combined, and the item attribute information corresponding to the plurality of sample item identifiers are searched out from the item database of the current product to be stored in the item attribute database.

In training the model, the identifier database, the user attribute database, and the item attribute database are loaded into the memory to improve the efficiency of reading the data.

In S520, the corresponding user attribute information and item attribute information are searched out from the user attribute database and the item attribute database based on the plurality of sample user identifiers and the plurality of sample item identifiers recorded in the identifier database, and the corresponding user attribute information and item attribute information, together with the plurality of sample user identifiers and the plurality of sample item identifiers, are organized into training data.

In the process, for each piece of sample record in the identifier database, the corresponding user attribute information and item attribute information are searched out from the user attribute database and the item attribute database to complete the feature, and thus the training data is acquired. For example, for a first sample record "user_id=110, item_id=6010" in the identifier database in FIG. 6, a data record corresponding to the user_id=110 is searched out from the user attribute database in FIG. 7, and thus the user attribute information "age being 16, gender being male" in the data record is acquired; and a data record corresponding to the item_id=6010 is searched out from the sample attribute database in FIG. 8, and thus the sample attribute information "tag being exercise, outside, country being IN" in the data record is acquired. The above acquired data is taken as the feature of "user_id=110, item_id=6010" to be completed, and thus the training data is acquired. Analogously, all data records in FIG. 6 are traversed, and a final training data set as shown in FIG. 9 is acquired.

In S530, the prediction models are generated by model training the training data according to a predetermined model training rule.

In some embodiments, the prediction model is generated by training the training data in in a batchwise fashion.

In some embodiments, the sample data is arranged into three parts to be stored by three databases, that is, the identifier database configured to store the plurality of sample user identifiers and the plurality of sample item identifiers interacted with the plurality of sample user identifiers, the user attribute database configured to store the user attribute information corresponding to the plurality of sample user identifiers, and the item attribute database configured to store the item attribute information corresponding to the plurality of sample item identifiers. In the case that the model needs to be trained, the corresponding user attribute information and item attribute information are respectively searched out from the user attribute database and the item attribute database based on the sample user identifiers and the sample item identifiers recorded in the identifier database, and the corresponding user attribute information and item attribute information, together with the sample user identifiers and the sample item identifier, are organized into the training data. In this way, data in the user attribute database and the item attribute database is shared to compress the sample data.

Figure 10:
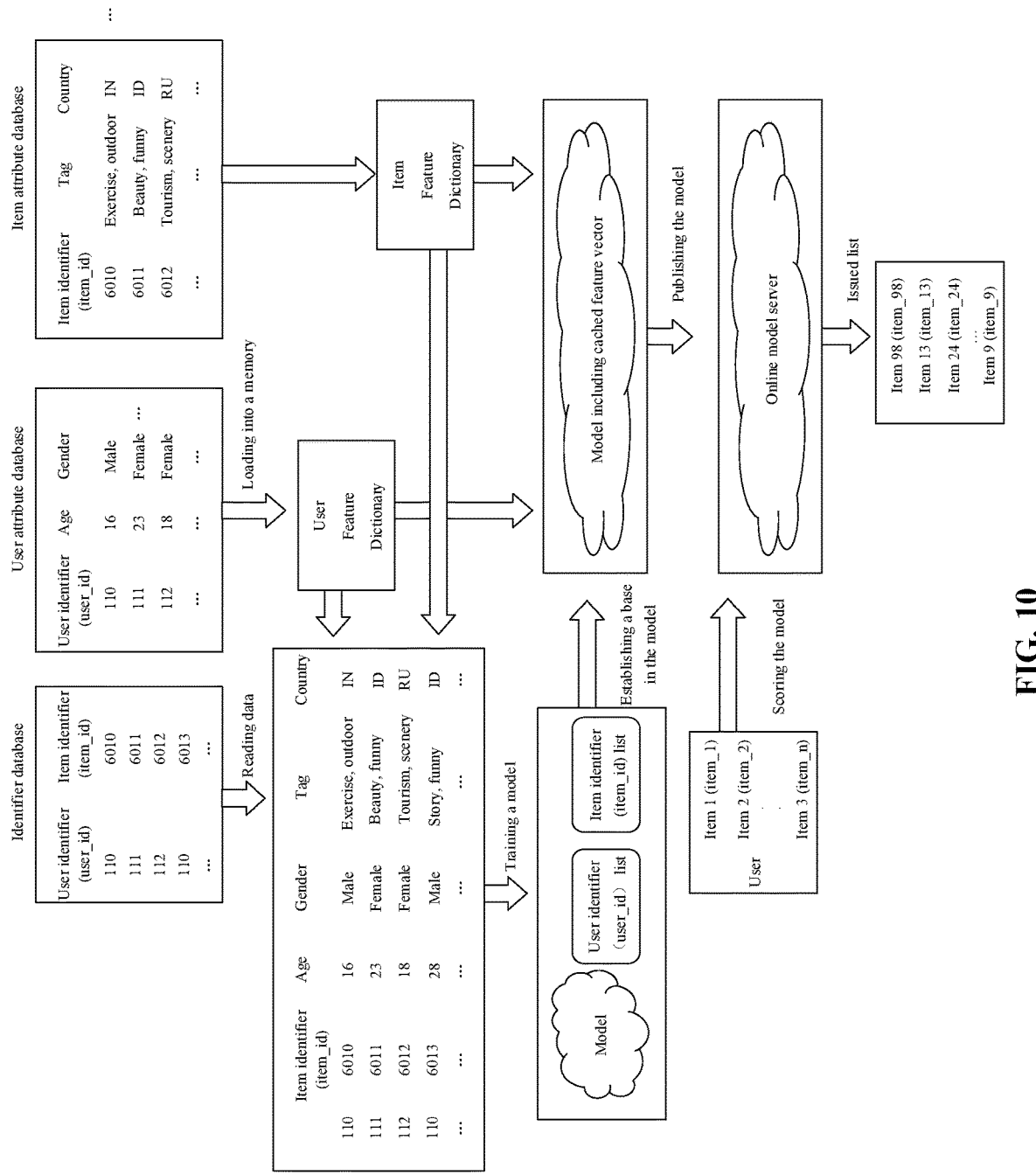
FIG. 10 is a flowchart of a training and predicting scenario of an online prediction model according to some embodiments of the present disclosure.

FIG. 10 is a flowchart of a training and predicting scenario of an online prediction model according to some embodiments of the present disclosure. The flowchart includes the following processes: a sample data compressing process, a model training process, a model establishing base process, and an online ranking process.

In the sample data compressing process, a conventional mode of storing the sample data is revised, and the sample data is arranged into three parts: the identifier database, the user attribute database, and the item attribute database. The identifier database is configured to store the user_id and item_id, and the user attribute information and the item attribute information are respectively stored to the user attribute database and the item attribute database. The features shared by the plurality of samples are organized into a separate feature file (that is, the user attribute database and the item attribute database). In this way, the feature data is shared to compress the training data.

In the model training process, the feature data shared by the samples are loaded into the memory in training. In training, the corresponding attribute feature is first read from the memory based on the user_id and item_id stored in the identifier database, so as to complete the feature of the sample. Then, the model is trained and updated in the mode of Batch training. In addition, the user_id and item_id occurred in the sample are recorded in training the model for sequent use.

In the model establishing base process, the prediction model acquired in previous training process is loaded, and the user_id and item_id occurred in the sample recorded in previous process are input. The corresponding attribute feature is read from the memory to complete the feature of the sample, and then the sample is predicted by the prediction model. In predicting, a part of intermediate tensor in the offline prediction model is cached into the online prediction model, and is stored together with the model parameters of the online prediction model.

In the online ranking process, the online prediction model cached with the intermediate tensor data is published to the online service for the online service to call. The original features of the user and the candidate item are not read and pre-processed in the case that the candidate item is scored upon the online prediction model being called, and the target user identifier and the candidate item identifier are input to the online prediction model. The online prediction model searches for the corresponding tensor data form the cached tensor data based on the target user identifier and the candidate item identifier, so as to predict based on the searched-out tensor data.

In the embodiments, the property of predicting the model in the real-time online recommendation system is improved, the prediction time of online model is reduced, and the machine cost is significantly reduced.

Figure 11:
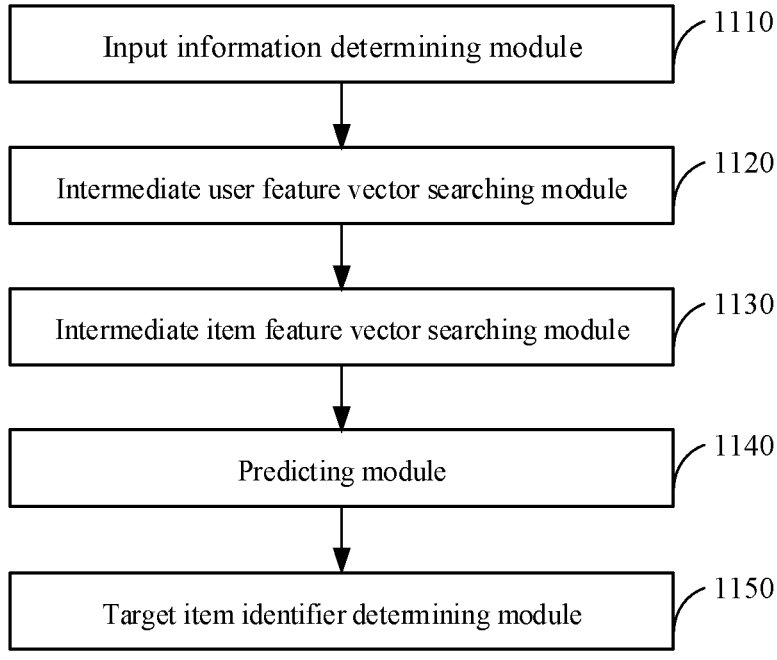
FIG. 11 is a block diagram of a recommendation apparatus according to some embodiments of the present disclosure.

FIG. 11 is a block diagram of a recommendation apparatus according to some embodiments of the present disclosure. The recommendation apparatus includes:

an input information determining module 1110, configured to determine a target user identifier and a plurality of candidate item identifiers input to a trained online prediction model, wherein the online prediction model stores intermediate user feature vectors corresponding to a plurality of sample user identifiers and intermediate item feature vectors corresponding to a plurality of sample item identifiers;

an intermediate user feature vector searching module 1120, configured to acquire the intermediate user feature vector corresponding to the target user identifier by searching for the target user identifier from the plurality of sample user identifiers in the online prediction model;

an intermediate item feature vector searching module 1130, configured to acquire the intermediate item feature vectors corresponding to the plurality of candidate item identifiers by searching for the plurality of candidate item identifiers from the plurality of sample item identifiers in the online prediction model;

a predicting module 1140, configured to output degrees of matching of the plurality of candidate item identifiers and the target user identifier by predicting the intermediate user feature vector corresponding to the target user identifier and the intermediate item feature vectors corresponding to the plurality of candidate item identifiers in the online prediction model; and a target item identifier determining module 1150, configured to determine, based on the degrees of matching of the plurality of candidate item identifiers and the target user identifier, a target item identifier configured to be recommended to the target user identifier from the plurality of candidate item identifiers.

In some embodiments of the present disclosure, the recommendation apparatus further includes:

a first predetermined vector determining module, configured to determine the intermediate user feature vector corresponding to the target user identifier as a first predetermined vector in response to determining that the target user identifier is not searched out in the plurality of sample user identifiers in the online prediction model;

a second predetermined vector determining module, configured to determine the intermediate item feature vector corresponding to the candidate item identifier as a second predetermined vector in response to determining that the candidate item identifier is not searched out in the plurality of sample item identifiers in the online prediction model.

Figure 12:
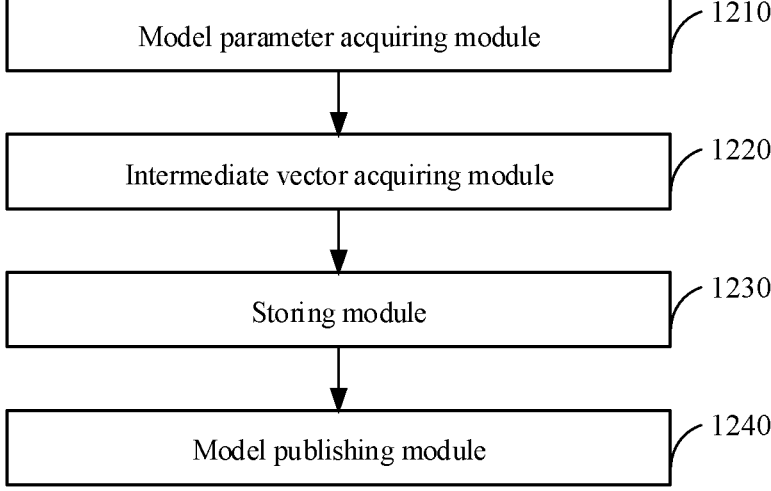
FIG. 12 is a block diagram of an apparatus for publishing an online prediction model according to some embodiments of the present disclosure.

FIG. 12 is a block diagram of an apparatus for publishing an online prediction model according to some embodiments of the present disclosure. The apparatus includes:

a model parameter acquiring module 1210, configured to acquire model parameters of the online prediction model and model parameters of an offline prediction model;

an intermediate vector acquiring module 1220, configured to acquire intermediate user feature vectors generated by an offline prediction model for a plurality of sample user identifiers and intermediate item feature vectors generated by the offline prediction model for a plurality of sample item identifiers;

a storing module 1230, configured to store the intermediate user feature vectors corresponding to the plurality of sample user identifiers, the intermediate item feature vectors corresponding to the plurality of sample item identifiers, and the model parameters to a predetermined database; and a model publishing module 1240, configured to publish the online prediction model based on the predetermined database.

In some embodiments of the present disclosure, the model parameter acquiring module 1210 includes:

a prediction model training sub-module, configured to train the prediction models; and a pruning sub-module, configured to acquire the model parameters of the online prediction model and the model parameters of the offline prediction model by pruning the prediction models based on a pruning rule.

In some embodiments of the present disclosure, the prediction model training sub-module includes:

a memory loading unit, configured to load a predetermined identifier database, a predetermined user attribute database, and a predetermined item attribute database into a memory, wherein the identifier database is configured to store the plurality of sample user identifiers and the plurality of sample item identifiers interacted with the plurality of sample user identifiers, the user attribute database is configured to store user attribute information corresponding to the plurality of sample user identifiers, and the item attribute database is configured to store item attribute information corresponding to the plurality of sample item identifiers;

a training data organizing unit, configured to search for the corresponding user attribute information and item attribute information from the user attribute database and the item attribute database based on the plurality of sample user identifiers and the plurality of sample item identifiers recorded in the identifier database, and organize, together with the plurality of sample user identifiers and the plurality of sample item identifiers, into training data; and a model training unit, configured to generate the prediction models by model training the training data according to a predetermined model training rule.

In some embodiments of the present disclosure, the offline prediction model includes a user offline prediction model and an item offline prediction model; and the intermediate vector acquiring module 1220 includes:

an intermediate user feature vector acquiring sub-module, configured to input the plurality of sample user identifiers and the user attribute information corresponding to the plurality of sample user identifiers to the user offline prediction model, and acquire the intermediate user feature vectors corresponding to the plurality of sample user identifiers output by the user offline prediction model; and an intermediate item feature vector acquiring sub-module, configured to input the plurality of sample item identifiers and the corresponding item attribute information to the item offline prediction model, and acquire the intermediate item feature vectors corresponding to the plurality of sample item identifiers output by the item offline prediction model.

It should be noted that the above apparatus in the embodiments of the present disclosure is capable of performing the method in any one of embodiments of the present disclosure, and has the corresponding functional modules and beneficial effects of the methods.

Figure 13:
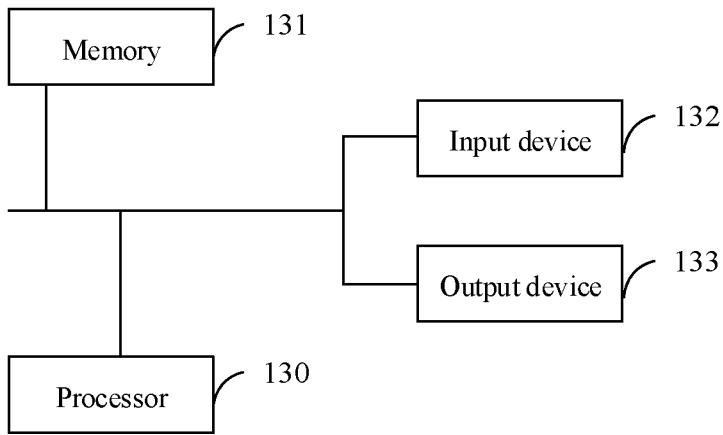
FIG. 13 is a schematic structural diagram of a computer device according to some embodiments of the present disclosure.

FIG. 13 is a schematic structural diagram of a computer device according to some embodiments of the present disclosure. As shown in FIG. 13, the device/terminal/server includes a processor 130, a memory 131, an input device 132, and an output device 133. One or more processors 130 are provided in the computer device, and FIG. 13 uses one processor 130 as an example. The processor 130, the memory 131, the input device 132, and the output device 133 in the computer device are connected via a bus or other manner, and FIG. 13 uses the bus as an example.

The memory 131, as a computer-readable storage medium, is configured to store a software program, a computer-executable program, and modules, such as the program instructions/modules in the recommendation method or the method for publishing the online prediction model in the embodiments of the present disclosure (for example, the input information determining module 1110, the intermediate user feature vector searching module 1120, the intermediate item feature vector searching module 1130, the predicting module 1140, and the target item identifier determining module 1150 in the recommendation apparatus; or, the model parameter acquiring module 1210, the intermediate vector acquiring module 1220, the storing module 1230, and the model publishing module 1240 in the apparatus for publishing the online prediction model). The processor 130, when loading and running the software programs, instructions, and modules stored in the memory 131, is caused to perform a plurality of function applications and data processing of the computer device, that is, perform the above recommendation method or the method for publishing the online prediction model.

The memory 131 includes a program storage region and a data storage region. The program storage region stores an operation system, and application required by at least one function, and the data storage region stores data established based on the use of the terminal. In addition, the memory 131 includes a high-speed random access memory, and a non-volatile memory, such as at least one of a disk memory, a flash memory, or other non-volatile solid-state memory. In some embodiments, the memory 131 includes a remotely set memory relative to the processor 130, and the remotely set memory is connected to the computer device over a network. Examples of the network include, but not limited to, the Internet, enterprise intranets, local area networks, mobile communication networks and their combinations.

The input device 132 is configured to receive input data or character information, and generate key input signals related to user setting and the function control of the computer device. The output device 133 includes a display screen, and other display device.

A storage medium including computer-executable instructions is provided in the ninth embodiment. The computer-executable instructions, when loaded and executed by a processor of a computer, cause the processor to perform the method in any one of above embodiments.

Based on the above description of the embodiments, it can be obvious for those skilled in the art that the present disclosure is implemented by means of software and necessary general hardware, or by means of hardware. On this basis, the essences or the contribution to the practices of the technical solutions of the present disclosure are presented in the form of a software product. The computer software product is stored in a computer-readable storage medium, such as a computer floppy disk, a read-only memory (ROM), a random-access memory (RAM), a flash, a hard disk or optical disc, and the like, and includes a plurality of instructions to cause a computer device (may be a personal computer, server, or network device, and the like) to perform the method in the embodiments of the present disclosure.

It should be noted that in the above embodiments of the apparatus, the serval units and modules are only divided according to the functional logic, but are not limited to the above division, as long as the corresponding functions are realized. In addition, the specific names of the multifunctional units are only for distinguishing, and are not intended to limit the scope of protection in the present disclosure.

It should be noted that the above are only exemplary embodiments and the used technical principles of the present disclosure. It should be noted for those skilled in the art that the present disclosure is not limited to the specific embodiments described herein, and obvious variations, modifications and substitutions can be made without departing from the scope of the protection of the present disclosure. Therefore, although the present disclosure is described in detail by the above embodiments, the present disclosure is not limited to the above embodiments and may include many other equivalent embodiments without departing from the conception of the present disclosure, and the scope of the protection of the present disclosure is determined by the scope of the attached claims.

16

The invention claimed is:

1. A recommendation method, comprising:
inputting a target user identifier and a plurality of candidate item identifiers to a trained online prediction model, wherein the online prediction model stores a plurality of sample user identifiers and intermediate user feature vectors corresponding to the plurality of sample user identifiers and a plurality of sample item identifiers and intermediate item feature vectors corresponding to the plurality of sample item identifiers;
acquiring the intermediate user feature vector corresponding to the target user identifier by searching for the target user identifier from the plurality of sample user identifiers in the online prediction model;
acquiring the intermediate item feature vectors corresponding to the plurality of candidate item identifiers by searching for the plurality of candidate item identifiers from the plurality of sample item identifiers in the online prediction model;
outputting degrees of matching of the plurality of candidate item identifiers and the target user identifier by predicting the intermediate user feature vector corresponding to the target user identifier and the intermediate item feature vectors corresponding to the plurality of candidate item identifiers in the online prediction model; and
determining, based on the degrees of matching of the plurality of candidate item identifiers and the target user identifier, a target item identifier to be recommended to the target user identifier from the plurality of candidate item identifiers;
wherein the online prediction model is published by:
acquiring model parameters of the online prediction model and model parameters of an offline prediction model;
acquiring intermediate user feature vectors generated by a sample user offline prediction model for a plurality of sample user identifiers and intermediate item feature vectors generated by the offline prediction model for a plurality of sample item identifiers;
storing the intermediate user feature vectors corresponding to the plurality of sample user identifiers, the intermediate item feature vectors corresponding to the plurality of sample item identifiers, and the model parameters to a predetermined database; and
publishing the online prediction model based on the predetermined database;
wherein the offline prediction model comprises a user offline prediction model and an item offline prediction model, and acquiring the intermediate user feature vectors generated by the sample user offline prediction model for the plurality of sample user identifiers and the intermediate item feature vectors generated by the offline prediction model for the plurality of sample item identifiers comprises:
inputting the plurality of sample user identifiers and user attribute information corresponding to the plurality of sample user identifiers to the user offline prediction model, and acquiring the intermediate user feature vectors corresponding to the plurality of sample user identifiers output by the user offline prediction model; and
inputting the plurality of sample item identifiers and item attribute information corresponding to the plurality of sample item identifiers to the item offline prediction model, and acquiring the intermediate item feature vectors corresponding to the plurality of sample item identifiers output by the item offline prediction model.

2. The recommendation method according to claim 1, wherein prior to outputting the degrees of matching of the plurality of candidate item identifiers and the target user identifier by predicting the intermediate user feature vector corresponding to the target user identifier and the intermediate item feature vectors corresponding to the plurality of candidate item identifiers in the online prediction model, the method further comprises:

determining the intermediate user feature vector corresponding to the target user identifier as a first predetermined vector in response to determining that the target user identifier is not searched out in the plurality of sample user identifiers in the online prediction model; or determining the intermediate item feature vector corresponding to the candidate item identifier as a second predetermined vector in response to determining that the candidate item identifier is not searched out in the plurality of sample item identifiers in the online prediction model.

3. A non-transitory computer-readable storage medium, storing one or more computer programs, wherein the one or more computer programs, when loaded and run by a processor, cause the processor to perform the recommendation method as defined in claim 1.

4. The non-transitory computer-readable storage medium according to claim 3, wherein the one or more computer programs, when loaded and run by a corresponding processor, cause the processor to perform:

determining the intermediate user feature vector corresponding to the target user identifier as a first predetermined vector in response to determining that the target user identifier is not searched out in the plurality of sample user identifiers in the online prediction model; or determining the intermediate item feature vector corresponding to the candidate item identifier as a second predetermined vector in response to determining that the candidate item identifier is not searched out in the plurality of sample item identifiers in the online prediction model.

5. A method for publishing an online prediction model, comprising:

acquiring model parameters of the online prediction model and model parameters of an offline prediction model;

acquiring intermediate user feature vectors generated by a sample user offline prediction model for a plurality of sample user identifiers and intermediate item feature vectors generated by the offline prediction model for a plurality of sample item identifiers;

storing the intermediate user feature vectors corresponding to the plurality of sample user identifiers, the intermediate item feature vectors corresponding to the plurality of sample item identifiers, and the model parameters to a predetermined database; and publishing the online prediction model based on the predetermined database;

wherein the offline prediction model comprises a user offline prediction model and an item offline prediction model, and acquiring the intermediate user feature vectors generated by the sample user offline prediction model for the plurality of sample user identifiers and the intermediate item feature vectors generated by the offline prediction model for the plurality of sample item identifiers comprises:

inputting the plurality of sample user identifiers and user attribute information corresponding to the plurality of sample user identifiers to the user offline prediction model, and acquiring the intermediate user feature vectors corresponding to the plurality of sample user identifiers output by the user offline prediction model; and inputting the plurality of sample item identifiers and item attribute information corresponding to the plurality of sample item identifiers to the item offline prediction model, and acquiring the intermediate item feature vectors corresponding to the plurality of sample item identifiers output by the item offline prediction model.

6. The method for publishing the online prediction model according to claim 5, wherein acquiring the model parameters of the online prediction model and the model parameters of the offline prediction model comprises:

training the prediction models; and acquiring the model parameters of the online prediction model and the model parameters of the offline prediction model by pruning the prediction models based on a pruning rule.

7. The method for publishing the online prediction model according to claim 6, wherein training the prediction models comprises:

loading a predetermined identifier database, a predetermined user attribute database, and a predetermined item attribute database into a memory, wherein the identifier database is configured to store the plurality of sample user identifiers and the plurality of sample item identifiers interacted with the plurality of sample user identifiers, the user attribute database is configured to store user attribute information corresponding to the plurality of sample user identifiers, and the item attribute database is configured to store item attribute information corresponding to the plurality of sample item identifiers;

searching for the corresponding user attribute information and item attribute information from the user attribute database and the item attribute database based on the plurality of sample user identifiers and the plurality of sample item identifiers recorded in the identifier database, and organizing, together with the plurality of sample user identifiers and the plurality of sample item identifiers, into training data; and generating the prediction models by model training the training data according to a predetermined model training rule.

8. A non-transitory computer-readable storage medium, storing one or more computer programs, wherein the one or more computer programs, when loaded and run by a processor, cause the processor to perform the method for publishing the online prediction model as defined in claim 5.

9. The non-transitory computer-readable storage medium according to claim 8, wherein the processor, when loading and running the one or more computer programs, is caused to perform:

training the prediction models; and acquiring the model parameters of the online prediction model and the model parameters of the offline prediction model by pruning the prediction models based on a pruning rule.

10. The non-transitory computer-readable storage medium according to claim 9, wherein the processor, when loading and running the one or more computer programs, is caused to perform:

loading a predetermined identifier database, a predetermined user attribute database, and a predetermined item attribute database into a memory, wherein the identifier database is configured to store the plurality of sample user identifiers and the plurality of sample item identifiers interacted with the plurality of sample user identifiers, the user attribute database is configured to store user attribute information corresponding to the plurality of sample user identifiers, and the item attribute database is configured to store item attribute information corresponding to the plurality of sample item identifiers;

searching for the corresponding user attribute information and item attribute information from the user attribute database and the item attribute database based on the plurality of sample user identifiers and the plurality of sample item identifiers recorded in the identifier database, and organizing, together with the plurality of sample user identifiers and the plurality of sample item identifiers, into training data; and generating the prediction models by model training the training data according to a predetermined model training rule.

11. The non-transitory computer-readable storage medium according to claim 8, wherein the offline prediction model comprises a user offline prediction model and an item offline prediction model, and the processor, when loading and running the one or more computer programs, is caused to perform:

inputting the plurality of sample user identifiers and user attribute information corresponding to the plurality of sample user identifiers to the user offline prediction model, and acquiring the intermediate user feature vectors corresponding to the plurality of sample user identifiers output by the user offline prediction model; and inputting the plurality of sample item identifiers and item attribute information corresponding to the plurality of sample item identifiers to the item offline prediction model, and acquiring the intermediate item feature vectors corresponding to the plurality of sample item identifiers output by the item offline prediction model.

12. A computer device for publishing the online prediction model, comprising: a memory, a processor, and one or more computer programs stored on the memory and runnable on the processor, wherein the processor, when loading and running the one or more computer programs, is caused to perform the method for publishing the online prediction model as defined in claim 5.

13. The computer device for publishing the online prediction model according to claim 12, wherein the processor, when loading and running the one or more computer programs, is caused to perform:

training the prediction models; and acquiring the model parameters of the online prediction model and the model parameters of the offline prediction model by pruning the prediction models based on a pruning rule.

14. The computer device for publishing the online prediction model according to claim 13, wherein the processor, when loading and running the one or more computer programs, is caused to perform:

loading a predetermined identifier database, a predetermined user attribute database, and a predetermined item attribute database into a corresponding memory, wherein the identifier database is configured to store the plurality of sample user identifiers and the plurality of sample item identifiers interacted with the plurality of sample user identifiers, the user attribute database is configured to store user attribute information corresponding to the plurality of sample user identifiers, and the item attribute database is configured to store item attribute information corresponding to the plurality of sample item identifiers;

searching for the corresponding user attribute information and item attribute information from the user attribute database and the item attribute database based on the plurality of sample user identifiers and the plurality of sample item identifiers recorded in the identifier database, and organizing, together with the plurality of sample user identifiers and the plurality of sample item identifiers, into training data; and generating the prediction models by model training the training data according to a predetermined model training rule.

15. The computer device for publishing the online prediction model according to claim 12, wherein the offline prediction model comprises a user offline prediction model and an item offline prediction model, and the processor, when loading and running the one or more computer programs, is caused to perform:

inputting the plurality of sample user identifiers and user attribute information corresponding to the plurality of sample user identifiers to the user offline prediction model, and acquiring the intermediate user feature vectors corresponding to the plurality of sample user identifiers output by the user offline prediction model; and inputting the plurality of sample item identifiers and item attribute information corresponding to the plurality of sample item identifiers to the item offline prediction model, and acquiring the intermediate item feature vectors corresponding to the plurality of sample item identifiers output by the item offline prediction model.

16. A recommendation computer device, comprising: a memory, a processor, and one or more computer programs stored on the memory and runnable on the processor, wherein the processor, when loading and running the one or more computer programs, is caused to perform:

inputting a target user identifier and a plurality of candidate item identifiers input to a trained online prediction model, wherein the online prediction model stores a plurality of sample user identifiers and intermediate user feature vectors corresponding to the plurality of sample user identifiers and a plurality of sample item identifiers and intermediate item feature vectors corresponding to the plurality of sample item identifiers;

acquiring the intermediate user feature vector corresponding to the target user identifier by searching for the target user identifier from the plurality of sample user identifiers in the online prediction model;

acquiring the intermediate item feature vectors corresponding to the plurality of candidate item identifiers by searching for the plurality of candidate item identifiers from the plurality of sample item identifiers in the online prediction model;

outputting degrees of matching of the plurality of candidate item identifiers and the target user identifier by predicting the intermediate user feature vector corresponding to the target user identifier and the intermediate item feature vectors corresponding to the plurality of candidate item identifiers in the online prediction model; and determining, based on the degrees of matching of the plurality of candidate item identifiers and the target user identifier, a target item identifier to be recommended to the target user identifier from the plurality of candidate item identifiers;

wherein the online prediction model is published by:

acquiring model parameters of the online prediction model and model parameters of an offline prediction model;

acquiring intermediate user feature vectors generated by an offline prediction model for a plurality of sample user identifiers and intermediate item feature vectors generated by the offline prediction model for a plurality of sample item identifiers;

storing the intermediate user feature vectors corresponding to the plurality of sample user identifiers, the intermediate item feature vectors corresponding to the plurality of sample item identifiers, and the model parameters to a predetermined database; and publishing the online prediction model based on the predetermined database;

wherein the offline prediction model comprises a user offline prediction model and an item offline prediction model, and acquiring the intermediate user feature vectors generated by the offline prediction model for the plurality of sample user identifiers and the intermediate item feature vectors generated by the offline prediction model for the plurality of sample item identifiers comprises:

inputting the plurality of sample user identifiers and user attribute information corresponding to the plurality of sample user identifiers to the user offline prediction model, and acquiring the intermediate user feature vectors corresponding to the plurality of sample user identifiers output by the user offline prediction model; and inputting the plurality of sample item identifiers and item attribute information corresponding to the plurality of sample item identifiers to the item offline prediction model, and acquiring the intermediate item feature vectors corresponding to the plurality of sample item identifiers output by the item offline prediction model.

17. The recommendation computer device according to claim 16, wherein the processor, when loading and running the one or more computer programs, is caused to perform:

determining the intermediate user feature vector corresponding to the target user identifier as a first predetermined vector in response to determining that the target user identifier is not searched out in the plurality of sample user identifiers in the online prediction model; or determining the intermediate item feature vector corresponding to the candidate item identifier as a second predetermined vector in response to determining that the candidate item identifier is not searched out in the plurality of sample item identifiers in the online prediction model.

* * * * *